(12) United States Patent
Rose et al.

(10) Patent No.: US 12,359,704 B2
(45) Date of Patent: Jul. 15, 2025

(54) DAMPER FOR AN AIR SPRING

(71) Applicant: Vibracoustic SE, Darmstadt (DE)

(72) Inventors: David Rose, Hamburg (DE); Philipp Werner, Lueneburg (DE)

(73) Assignee: Vibracoustic SE, Darmstadt (DE)

( * ) Notice: Subject to any disclaimer, the term of this patent is extended or adjusted under 35 U.S.C. 154(b) by 125 days.

(21) Appl. No.: 17/570,546

(22) Filed: Jan. 7, 2022

(65) Prior Publication Data

US 2022/0221022 A1 Jul. 14, 2022

(30) Foreign Application Priority Data

Jan. 8, 2021 (DE) .................. 102021100226.5

(51) Int. Cl.
*F16F 9/54* (2006.01)
*B60G 13/00* (2006.01)
*F16F 9/32* (2006.01)

(52) U.S. Cl.
CPC ............ *F16F 9/54* (2013.01); *B60G 2202/24* (2013.01); *B60G 2204/128* (2013.01); *B60G 2206/41* (2013.01); *F16F 2222/12* (2013.01); *F16F 2230/0005* (2013.01); *F16F 2230/0023* (2013.01); *F16F 2232/08* (2013.01)

(58) Field of Classification Search
CPC .. F16F 9/54; F16F 2222/12; F16F 2230/0005; F16F 2230/0023; F16F 2232/08; F16F 9/32; B60G 2202/24; B60G 2204/128; B60G 2206/41; B60G 13/00
See application file for complete search history.

(56) References Cited

U.S. PATENT DOCUMENTS

| | | | | |
|---|---|---|---|---|
| 3,603,575 A | * | 9/1971 | Arlasky | B60G 17/021 267/34 |
| 4,219,189 A | * | 8/1980 | Scrivo | B60G 15/068 267/221 |
| 4,438,908 A | * | 3/1984 | Terada | B60G 15/062 267/221 |
| 4,744,444 A | * | 5/1988 | Gillingham | F16F 9/512 267/221 |
| 4,962,834 A | * | 10/1990 | Miner | B60G 15/067 267/221 |
| 5,131,638 A | * | 7/1992 | Hein | F16F 1/387 267/141.4 |

(Continued)

FOREIGN PATENT DOCUMENTS

| | | |
|---|---|---|
| DE | 19803174 A1 | 9/1998 |
| DE | 19855974 C1 | 5/2000 |

(Continued)

OTHER PUBLICATIONS

Machine translation Pradel et al. DE 19855974 (Year: 2025).*

(Continued)

*Primary Examiner* — Robert A. Siconolfi
*Assistant Examiner* — James K Hsiao
(74) *Attorney, Agent, or Firm* — Fishman Stewart PLLC

(57) ABSTRACT

A damper comprising a connection structure and a damper rod connected to the connection structure via a connection. In embodiments, the connection is made via a locking ring. A method of using a locking ring in a damper for fixing a damper rod to a connection structure is disclosed.

20 Claims, 2 Drawing Sheets

(56) References Cited

U.S. PATENT DOCUMENTS

| | | | | |
|---|---|---|---|---|
| 5,544,725 | A * | 8/1996 | Handke | F16F 9/54 267/221 |
| 5,730,262 | A * | 3/1998 | Rucks | F16F 9/58 403/269 |
| 5,878,851 | A * | 3/1999 | Carlson | F16F 9/3242 188/269 |
| 5,921,166 | A * | 7/1999 | Machida | F15B 15/08 277/435 |
| 6,290,218 | B1 * | 9/2001 | Mayerbock | B60G 15/067 280/124.147 |
| 6,357,564 | B1 * | 3/2002 | Tantius | B60G 15/063 188/266.5 |
| 6,394,436 | B1 * | 5/2002 | Schnaars | B60G 13/003 280/124.147 |
| 6,923,462 | B2 * | 8/2005 | Tantius | F16F 9/096 267/221 |
| 7,017,892 | B2 * | 3/2006 | Hurrlein | B60G 15/062 267/220 |
| 8,256,965 | B2 * | 9/2012 | Kaneko | F16C 17/18 384/420 |
| 8,474,846 | B2 * | 7/2013 | Dubus | F16C 33/767 280/124.147 |
| 9,028,150 | B2 * | 5/2015 | Nagashima | F16F 9/54 280/124.147 |
| 9,085,211 | B2 * | 7/2015 | Wilson | B60G 11/22 |
| 9,975,388 | B2 * | 5/2018 | Brown | B60G 15/067 |
| 10,005,496 | B2 * | 6/2018 | Shin | B62D 21/11 |
| 10,086,869 | B2 * | 10/2018 | Urbanski | B62D 7/22 |
| 10,228,057 | B2 * | 3/2019 | Hudson | F16C 11/0614 |
| 10,835,041 | B2 * | 11/2020 | Battey | A47C 5/12 |
| 2003/0234147 | A1 * | 12/2003 | Lun | F16F 9/58 188/321.11 |
| 2009/0283373 | A1 * | 11/2009 | Satou | F16F 9/585 188/319.1 |
| 2011/0120822 | A1 * | 5/2011 | Kondou | F16F 9/065 188/269 |
| 2011/0278778 | A1 * | 11/2011 | Qattan | F16F 3/00 267/171 |
| 2013/0009376 | A1 * | 1/2013 | Kaneko | F16C 33/20 384/216 |
| 2014/0070471 | A1 * | 3/2014 | Wilson | B60G 15/067 267/292 |
| 2014/0138198 | A1 * | 5/2014 | Ozaki | F16F 9/54 188/321.11 |
| 2014/0299736 | A1 * | 10/2014 | Itou | B60G 13/003 248/611 |
| 2016/0243913 | A1 * | 8/2016 | Yamazaki | F16F 9/063 |
| 2018/0304842 | A1 * | 10/2018 | Krensky | F16F 1/36 |
| 2022/0032436 | A1 * | 2/2022 | Holcombe | B25D 17/005 |

FOREIGN PATENT DOCUMENTS

| | | |
|---|---|---|
| DE | 29912481 U1 | 9/2000 |
| DE | 29923730 U1 | 2/2001 |
| DE | 20219730 U1 | 3/2003 |
| DE | 102004051731 A1 | 5/2006 |
| DE | 202010001752 U1 | 7/2010 |
| DE | 102020002905 A1 | 7/2020 |
| FR | 2898170 A1 | 9/2007 |

OTHER PUBLICATIONS

German Office Action, 10 2021 100 226.5, with google machine translate.

Extended European Search Report, EP21211973.9, dated Jun. 8, 2022.

German Office Action, DE 10 2021 100 226.5, dated Nov. 21, 2023 (with translation).

* cited by examiner

DAMPER FOR AN AIR SPRING

CROSS-REFERENCE TO RELATED APPLICATIONS

This application claims priority to German Patent Application No. DE 10 2021 100 226.5, filed Jan. 8, 2021, the contents of which are hereby incorporated by reference in its entirety.

TECHNICAL FIELD

The invention relates to a damper for an air spring and use thereof.

BACKGROUND

A damper or vibration damper of the type described above is used in a vehicle chassis to dampen the vibrations caused by road unevenness. For this purpose, it is known to connect the damper to the vehicle via a so-called strut mount or strut support bearing or strut support bearing to the vehicle body. The strut support bearing enables vibration decoupling of the strut or vibration damper relative to the vehicle body and compensates for any angular offset of the damper relative to the vehicle body, in particular cardanic angles. The strut support bearing typically includes a rubber-to-metal bearing and a housing. This rubber-metal bearing is usually located in a bearing mount, the housing of a strut support bearing, which is bolted to the vehicle body.

To attach the damper to the vehicle body, the damper rod is bolted to the core of the rubber-metal bearing. This bolting is usually done at the upper end of the cross-sectionally round, high-precision and often hardened damper rod. Since the screw connection can be loosened, it is impossible to prove that the screw connection has been improperly loosened and that the strut support bearing has been replaced by a counterfeit. Unjustified claims for damages may arise.

Bolting the damper rod to the core of the rubber-metal bearing and thus to the strut support bearing is fundamentally a challenge, as it is difficult to fix the damper rod against rotation about its central longitudinal axis during assembly in order to apply a defined tightening torque during bolting. For example, key surfaces can be attached to the damper rod, but these weaken the diameter. Alternatively, fixing structures, such as an internal hexagon, can be introduced into the end face of the damper rod. This in turn can result in the diameter of the damper rod having to be larger than necessary for operation. Rotation-preventing elements or recesses are therefore a disadvantage.

The use of a bolted connection is also associated with large tolerances with regard to the preload force. To achieve a minimum preload force, a large safety factor must therefore be taken into account, which also leads to a large damper rod diameter. A large damper rod diameter in turn leads to a large volume displacement in the inner tube in a twin-tube damper, for example. For a given outer tube diameter, this leads to greater stroke dynamics of the outer fluid column and thus to a greater risk of foaming of the fluid, which in turn leads to an impairment of the damper characteristic curve.

SUMMARY

It is therefore an object of the invention to create a damper which permits simple, secure and non-destructively detachable fixing of the damper rod to a strut support bearing and reliably prevents fluid foaming.

Various features of the invention, and embodiments thereof, are disclosed herein.

According to embodiments of the invention, a damper is proposed comprising a linkage structure and a damper rod connected to the linkage structure via a linkage, wherein the connection is made by means of a lock ring (which may also be referred to as a locking ring or a lock bolt). A lock ring or lock bolt may comprise a cylindrical collar with a smooth internal bore and the collar may be provided over a component (e.g., a pin or rod with annular closing or locking grooves). When installed (e.g., by mechanical operation or swaging), the lock ring or lock bolt may provide direct surface-to-surface contact with an associated component.

The damper, which can be an air spring damper or a spring strut, thus overcomes the problems of the prior art in a surprisingly simple way. The locking ring forms a positive and/or non-positive connection with the damper rod. By using a lock ring, the achievable axial preload forces can be significantly increased for a given outer tube diameter of the damper. At the same time, the previously problematic dispersion of the preload forces is reduced compared with a screw connection. For example, a lock ring can achieve the preload forces of a larger standard bolt connection. The locking ring itself can therefore be smaller (inner diameter and/or outer diameter and/or axial height) than the outer hexagon nut used up to now as the fastener for the screw connection. The axial clamping force of the fastener can, for example, be greater than 65 kN, greater than 90 kN or greater than 115 kN.

As a result of the fact that a smaller damper rod diameter is now possible with comparable clamping forces, the stroke dynamics of the fluid column can be reduced, which considerably reduces the foaming tendency of the fluid, especially in the case of twin-tube dampers. However, even with single-tube dampers, a smaller damper rod diameter leads to a reduction in the additional volume caused by immersion and thus to a calming of the overall system.

Unexpectedly, the formation of a lock ring connection between the damper rod and a linkage structure leads to significantly improved damper characteristics by reducing the tendency for the damper fluid to foam due to the associated reduction in damper rod diameter.

According to one embodiment of the damper according to the invention, the damper rod can have locking grooves (or closing grooves), preferably integrally formed at one end, which form a positive and/or non-positive connection with the locking ring. The locking grooves can be formed integrally with the damper rod. The locking grooves can be arranged plane-parallel to each other or have no pitch, such as a thread. This prevents unintentional twisting of the locking ring. The locking grooves can each be annular. The locking grooves of the locking ring connection can thus already be formed during manufacture of the damper rod.

At one end, the damper rod can preferably have integrally formed gripping grooves which can be gripped by a setting tool. The gripping grooves can be formed integrally with the damper rod. The gripping grooves can be arranged plane-parallel to each other or have no pitch, such as a thread. The gripping grooves of the lock ring connection can thus already be formed during manufacture of the damper rod. However, it is also possible that no gripping grooves are present and the setting tool grips the locking grooves.

After setting, the damper rod and the locking ring are in a form-fit and/or force-fit connection. For damper rods with a breakaway part, setting can be carried out as follows. The lock ring is placed on the unshaped damper rod in the area of the setting grooves and, if necessary, positioned at a defined point. A setting tool is then fitted which can grip the damper rod at the gripping grooves and is supported on the lock ring. By tightening the tear-off part, the parts to be joined (damper rod and locking ring) are pressed together and the locking ring is molded into the locking grooves of the damper rod. Any gap between the locking ring and the component against which it rests is closed. At a defined force, the deformation sleeve of the mold begins to mold the locking ring plastically into the locking grooves of the damper rod. Further compression lengthens the locking ring and thus axially also the damper rod, and generates a precise preload force. The joining process is complete when the setting tool strikes a joining part surface, for example an abutment surface of the connection structure, and the increasing tensile stress in the damper rod separates the breakaway part at the predetermined breaking point. The damper rod is not secured against rotation during the joining process.

Setting can be carried out as follows for damper rods without a breakaway section. The locking ring is positioned on the unformed damper rod in the area of the locking grooves and, if necessary, at a defined location. A setting tool is then fitted which can grip the damper rod at the locking grooves or gripping grooves and is supported on the locking ring. When the damper rod is tightened, the parts to be joined (damper rod and locking ring) are pressed together and the locking ring is formed into the locking grooves of the damper rod. Any gap between the locking ring and the component against which it rests is closed. At a defined force, the deformation sleeve of the mold begins to mold the locking ring plastically into the locking grooves of the damper rod. Further deformation or compression lengthens the locking ring and thus also the damper rod axially and generates a precise preload force. When the plastic molding of the lock ring into the locking grooves of the damper rod is complete, the setting tool pushes off the set lock ring and/or damper rod. Here, too, the damper rod is not secured against rotation during the joining process.

According to one embodiment of the damper according to the invention, the damper rod can have a diameter-reducing stepped section, as well as a shaft section between the stepped section and the lock ring, wherein the connection structure is arranged on the shaft section and is fixed there between the lock ring and the stepped section in a force-fitting and/or form-fitting manner. The shaft section can be reduced in diameter compared to a directly adjacent section of the damper rod. The connection structure can be arranged on the shaft section. The shaft section can be smooth and/or have closing (locking) grooves at least in sections. The connection structure can be plugged or pressed onto the shaft section.

According to one possible embodiment of the damper according to the invention, the tethering structure may be the core of a rubber bearing comprising an elastomeric body. The tether structure may be formed of metal or plastic.

According to one embodiment of the damper according to the invention, an element clamped by the locking ring can be formed from a plastic, such as the connecting structure. A further advantage of the invention is that clamped elements made of plastic can also be included and/or elements made of different materials can be clamped together securely and permanently. On the other hand, setting of screwed components can lead to loosening of the screw connection. This risk does not exist with the locking ring, since it ensures a secure connection even when the pretension force is lost by setting, even with plastic parts. The use of a locking ring bolt also makes it possible to conceive of receiving structures and/or components made of plastics within the force flow of the pretension force. Even setting of these plastic parts in the force flow and the associated reduction in the pretension force cannot lead to loosening of the connection, e.g. loosening of the screw connection, as the connection is non-detachable and thus insensitive to pretension force reduction.

According to one embodiment of the damper according to the invention, the connection structure may have contact surfaces arranged on opposite sides and a reach-through opening for the damper rod, the connection structure preferably being supported by an elastomer body, the locking ring preferably being supported directly against one of the two contact surfaces. The passage opening can extend in the longitudinal direction of the damper. The connection structure can be flat or disc-shaped at least in its connection area. One of the abutment surfaces may be supported against the step section or the step. The support can be direct. The locking ring is supported against one of the contact surfaces or the other contact surface. The support may be direct, but other elements such as washers or sleeves may also be arranged in the force flow. The contact surfaces can be arranged longitudinally on opposite sides of the connection structure.

According to one embodiment of the damper according to the invention, the connection can be a lock ring connection with predetermined breaking point or without predetermined breaking point. The type with predetermined breaking point comprises closing grooves as well as axially adjacent gripping grooves. The type without predetermined breaking point comprises at least closing grooves. The latter type in particular is considerably less sensitive to corrosion, since such a connection has no fracture surface at the point where the pull-off part is ruptured when the lock ring is set.

In accordance with one embodiment of the damper of the invention, the damper rod can be arranged at its end having the connection within a receiving space formed by a receptacle and not project beyond an axial end region of the receptacle. The receptacle can be part of a suspension strut support bearing. Up to now, the damper rod has protruded beyond the axial end region of the receptacle. Since no tool now has to be used to prevent rotation, the projection can be dispensed with. It is also conceivable that the end of the damper rod is recessed relative to the axial end region of the mount. This requires considerably less installation space. It is irrelevant if the tear-off part protrudes beyond the axial end region of the mount before setting, as this is torn off during setting and the fracture surface is then arranged within the mounting space.

According to one embodiment of the damper according to the invention, the damper rod may be free of fixing recesses that serve to prevent rotation about the central longitudinal axis. The prevention relates to fixing the damper rod to the attachment structure. The fixing recesses can prevent rotation by, for example, allowing rotation-preventing tools to be inserted or applied there. Such fixing recesses are necessary in the prior art, for example, if a nut is used instead of a lock ring to fasten the damper rod to the strut support bearing. In this case, the torque introduced into the damper rod by the screwing process of the end nut is dissipated by wrench flats on the outer surface of the damper rod or by an internal hexagon on the end face of the damper rod. Both lead to a weakening of the damper rod, so that its diameter has to be larger than if there were no fixing recesses.

According to one embodiment of the damper according to the invention, the locking ring may have an embossing and/or authenticity embossing. It is true that the locking ring can be detached from the damper rod with the aid of a special tool and then fixed again with a new plastically formable locking ring. However, it is possible to emboss a locking ring when pressing it onto the damper rod. This embossing ensures that the original manufacturer fixes the locking ring to the damper rod in a process-compliant manner. If the embossing is at least in sections of complex geometry that is difficult to copy, it also serves as copy protection and thus protects against unjustified claims arising from the assembly of counterfeit products, in particular counterfeit suspension strut support bearings. In addition, a lock ring connection cannot be released non-destructively, which makes counterfeit installation considerably more difficult and easier to detect.

In accordance with embodiments of the invention, it is also proposed to use a lock ring in a damper for fixing a damper rod to a connecting structure. Through this use, a damper according to the disclosure can be formed. The advantages already described above with respect to the damper also result analogously for the use, to which reference is hereby made.

It is also possible to imagine a damper assembly comprising a damper according to the disclosure and a strut support bearing, in which case the linkage structure and the elastomer body are parts of the strut support bearing and the strut support bearing comprises the linkage structure and the elastomer body, respectively.

BRIEF DESCRIPTION OF THE DRAWINGS

Further features, details and advantages of the invention are apparent from the wording of the claims and from the following description of embodiments based on the drawings. Displaying:

DETAILED DESCRIPTION

Figure 1:
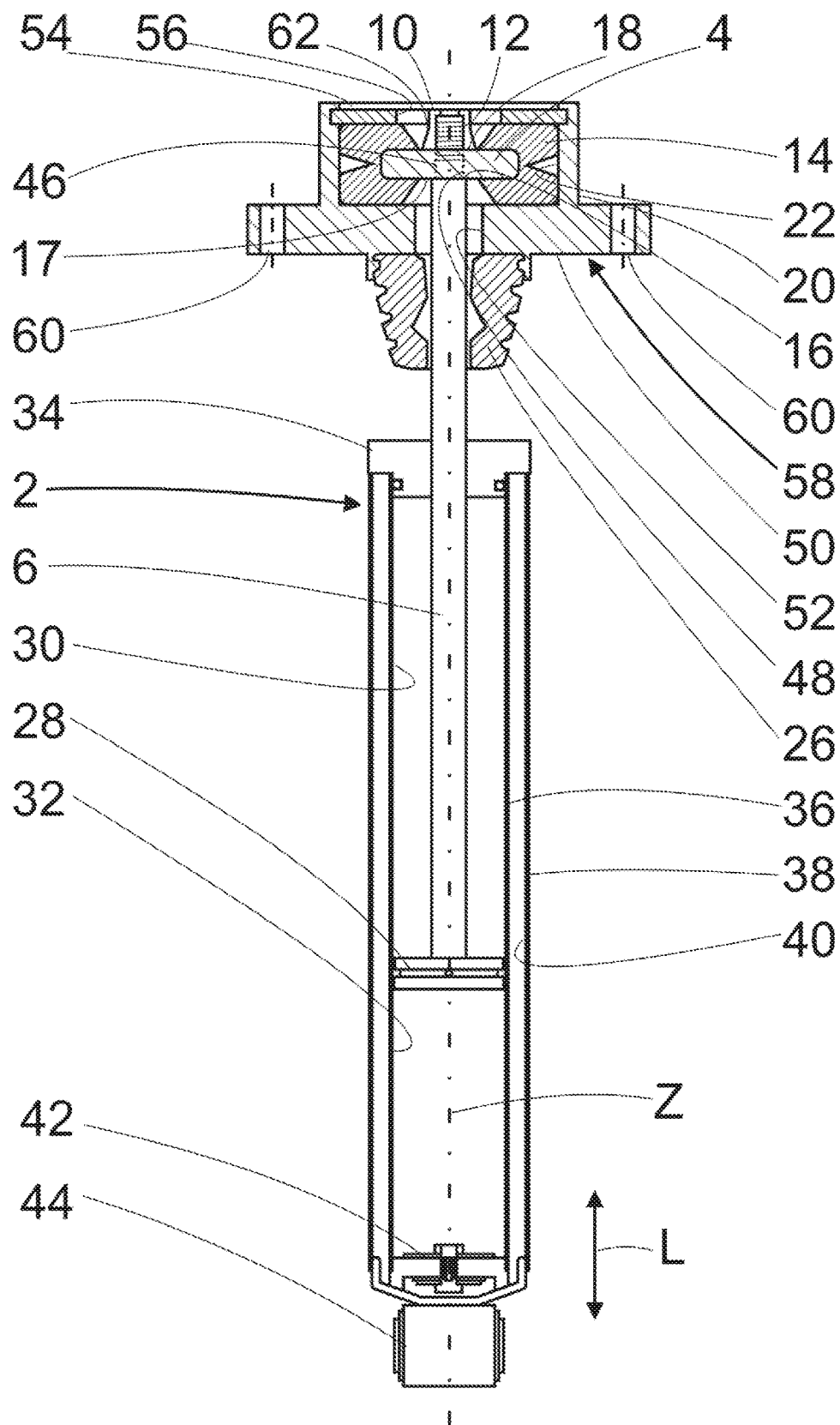
FIG. 1 generally illustrates a longitudinal sectional view of an embodiment of a damper according to the invention, and FIG. 2 generally illustrates a detailed view of the damper according to FIG. 1.
Figure 2:
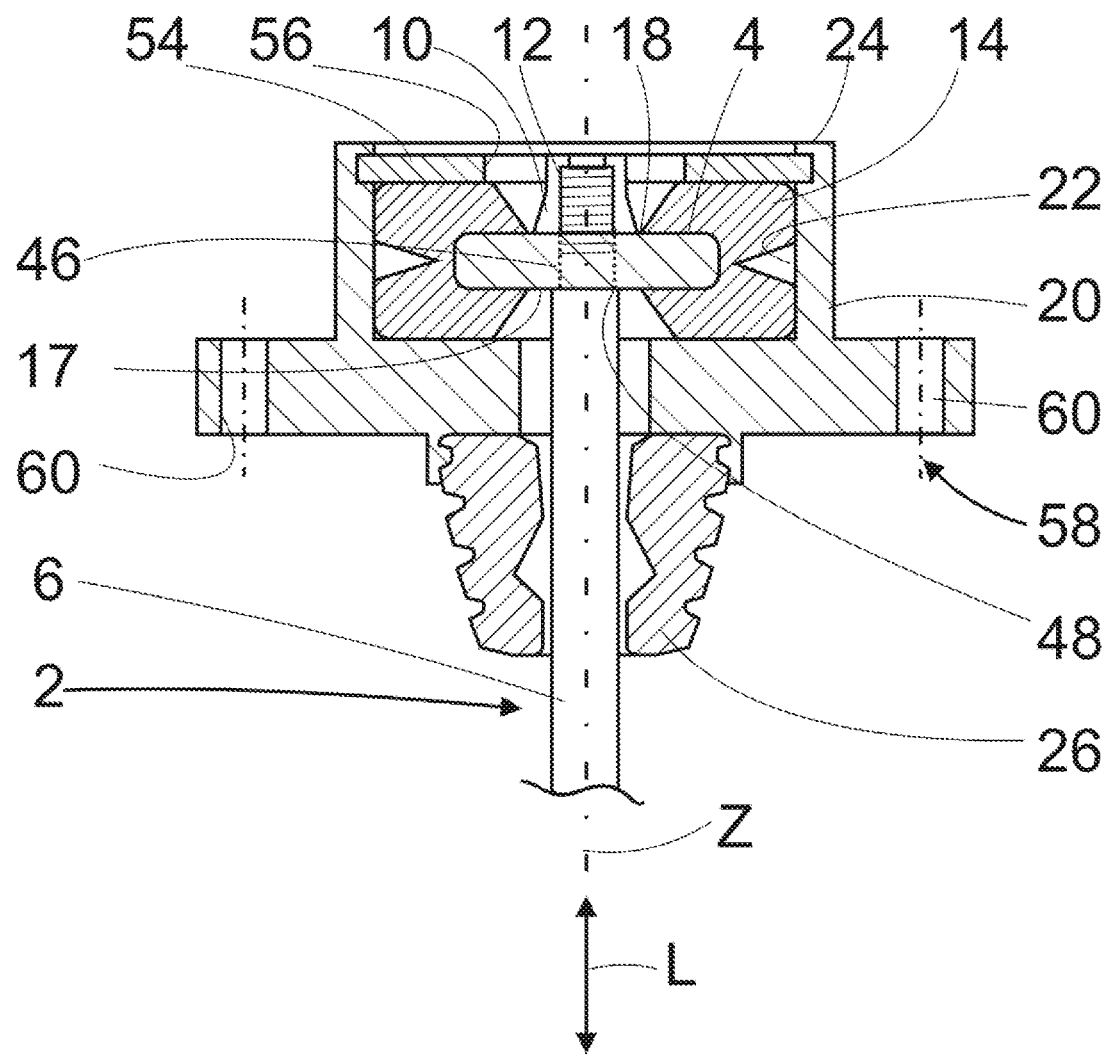

In the figures, identical or corresponding elements are designated with the same reference signs and are therefore not described again unless appropriate. Features already described are not described again to avoid repetition and are applicable to all elements with the same or corresponding reference signs, unless explicitly excluded. The disclosures contained in the entire description are applicable mutatis mutandis to identical parts with identical reference signs or identical component designations. Also, the positional indications selected in the description, such as top, bottom, side, etc., are related to the directly described as well as depicted figure and are to be transferred mutatis mutandis to the new position in the event of a change of position. Furthermore, individual features or combinations of features from the different embodiment examples shown and described can also represent independent, inventive solutions or solutions according to the invention.

The figures show a damper 2 which is designed as a twin-tube damper, but the invention is equally applicable to other damper types such as single-tube dampers. A central longitudinal axis Z extends through the damper 2 in the longitudinal direction L.

Damper 2 comprises an inner cylinder tube 36, into which a damper rod 6 extends adjustably along the central longitudinal axis Z. The damper rod 6 is guided on the inner wall of the inner cylinder tube 36 and seals against it. A piston 28 is arranged on the damper rod 6, guided on the inner wall of the inner cylinder tube 36 and sealing against it. The piston 28 divides the inner cylinder tube 36 into a first working chamber 30 and a second working chamber 32, each of which is filled with a pressure medium, such as a hydraulic oil. To delimit the first working chamber 30, the cylinder tube 36 is closed by a damper rod guide 34 which is fixed to one end face of the cylinder tube 36. The damper rod guide 34 has an opening for the damper rod 6. In addition, a sliding seal, which is not shown in more detail, can be provided on the damper rod guide 34 in the region of the damper rod 6. The second working chamber 32 is axially bounded by a valve 42, which is in fluid-conducting connection with a compensation chamber 40, which is attached to the other end of the inner cylinder tube 36.

The inner cylinder tube 36 is arranged with the damper rod guide 34 and the valve 42 in an outer cylinder tube 38. The compensation chamber 40 is formed between the outer wall of the inner cylinder tube 36 and the inner wall of the outer cylinder tube 38, which extends between the damper rod guide 34 and the valve 42. A mounting structure 44 is arranged on the outer cylinder tube 38, for example a mounting eye for an elastomer bearing.

At the opposite end, the damper is connected to a strut support bearing 58. The strut support mount 58 includes a receptacle 20 that includes a receptacle space 22 and a first wall 50. The first wall 50 forms a flange portion with drills 60 for securing the strut support bearing 58 to a body. The first wall 50 also has a first through opening 52 through which the damper rod 6 projects into the receptacle space 22. On the opposite side of the receptacle space 22 in the longitudinal direction L, a second wall 54 is arranged as a separate receptacle 20. The second wall 54 is held in a lid-like manner by the receptacle 20 and has a second reach-through opening 56 with a diameter. A connection structure 4 of the strut support bearing 58 is arranged in the receptacle space 22 and is partially vulcanized into a bearing elastomer body 14. The connection structure 4 and the elastomer body 14 are parts of the spring strut support bearing 58 and form a rubber bearing. The connection structure 4 is disc-shaped or plate-shaped, but it can also form any other geometry that is necessary to adjust the bearing characteristics. The connection structure 4 here forms the core of the rubber mount. The elastomer body 14 rests against the walls 50, 52 and the mount 20.

The tether structure 4 has a point-lined access opening 48 or third reach-through opening through which the damper rod 6 protrudes via a shaft section 46. On the one hand, the connection structure 4 rests via a contact surface 17 against a step formed by a step section 16 of the damper rod 6. The connection structure 4 is pressed against this step by a locking ring 10 (which may also be referred to as a lock ring or a lock bolt), which rests against an opposite contact surface 18 of the connection structure 4 in the longitudinal direction L. The connection structure 4 is pressed against the step by the locking ring 10. Circumferentially annular locking grooves 12 for the locking ring 10 are shown integrally with the damper rod 6, the figures showing the set locking ring 10. The locking ring 10 forms a positive and/or non-positive connection 8 with the locking grooves 12. There is an originality embossing 62 on the locking ring 10.

The diameter of the second reach-through opening 56 is sized to be approximately 2 times the outside diameter of the locking ring 10 prior to setting, and to provide enough radial space to guide and place a setting tool through the reach-through opening 56. Thus, the locking ring 10 is located entirely within the receptacle space 22. In addition, the damper rod 6 does not protrude in the longitudinal direction L beyond a frontal area 24 of the receptacle 22 at its end having the connection 8.

The adjustment motion of the damper 2 in the longitudinal direction L is limited by a buffer 26 arranged on the mount 20, against which the damper rod guide 34 can strike.

It is visible that damper rod 6 is free of fixing recesses, which serve to prevent rotation about the central longitudinal axis Z.

The invention is not limited to one of the above-described embodiments, but can be varied in many ways. All features and advantages resulting from the claims, the description and the drawing, including constructional details, spatial arrangements and process steps, can be essential to the invention both individually and in the most varied combinations.

Within the scope of the invention are all combinations of at least two of the features disclosed in the description, claims and/or figures.

To avoid repetition, features disclosed according to the invention should also be considered as disclosed according to the process and be claimable. Likewise, features disclosed according to the method should be considered as disclosed according to the invention and be claimable.

The invention claimed is:

1. A damper comprising:
   a rigid connection structure; and
   a damper rod joined to the connection structure by a connection; and
   an elastomer body that substantially surrounds or encloses the connection structure, the connection structure and the elastomer body form a bearing;
   wherein the connection comprises a locking ring, the locking ring is positioned into locking grooves of the damper rod, the locking ring and the damper rod are connected in a form-fit or a force-fit manner, and the locking ring is plastically deformed into the locking grooves of the damper rod; and
   wherein the damper rod is locked in position with the connection structure while permitting relative axial motion of the damper rod within the damper.

2. The damper according to claim 1, wherein the locking grooves of the damper rod are integrally formed at one end.

3. The damper according to claim 1, wherein the damper rod has a diameter-reducing step section and a shaft section between the diameter-reducing step section and the locking ring, the connection structure being provided on the shaft section and fixed between the locking ring and the diameter-reducing step section in a force-fitting and/or form-fitting manner.

4. The damper according to claim 1, wherein an element clamped by the locking ring is comprised of a plastic.

5. The damper according to claim 1, wherein the connection structure has contact surfaces arranged on opposite sides and an access opening for the damper rod, the connection structure is supported by the elastomer body, and the locking ring is supported directly against one of the two contact surfaces.

6. The damper according to claim 1, wherein the connection has a predetermined breaking point.

7. The damper according to claim 1, wherein the connection is without a predetermined breaking point.

8. The damper according to claim 1, wherein the damper rod includes an end having the connection within a receptacle space provided by a receptacle.

9. The damper according to claim 8, wherein the damper rod does not project beyond an axial end region of the receptacle.

10. The damper according to claim 8, wherein the receptacle is part of a strut support bearing.

11. The damper according to claim 8, wherein the receptacle includes a first wall, and the first wall includes a flange portion.

12. The damper according to claim 8, wherein the connection structure is provided in the receptacle space and is at least partially vulcanized.

13. The damper according to claim 1, wherein the connection structure is disc-shaped or plate-shaped.

14. The damper according to claim 1, wherein the damper rod is free of fixing recesses which serve to prevent rotation about a central longitudinal axis.

15. The damper according to claim 1, wherein the locking ring has an embossing and/or authenticity embossing.

16. A method comprising using a locking ring in a damper as recited in claim 1 for fixing a damper rod to a connection structure.

17. The damper according to claim 1, wherein the connection structure is supported by the elastomeric body.

18. The damper according to claim 17, wherein the elastomeric body extends radially around the connection structure and directly contacts contact surfaces on opposite sides of the connection structure.

19. The damper according to claim 18, wherein the elastomeric body is vulcanized.

20. The damper according to claim 1, wherein the locking ring includes a smooth internal bore.

* * * * *